(12) United States Patent
Von Hessberg et al.

(10) Patent No.: US 9,760,869 B2
(45) Date of Patent: Sep. 12, 2017

(54) VISUALISING MULTIPLE TIME ZONES

(71) Applicant: SKEDGO PTY LTD, The Rocks (AU)

(72) Inventors: Claus Von Hessberg, The Rocks (AU); Phil Bookallil, The Rocks (AU)

(73) Assignee: SKEDGO PTY LTD, The Rocks (AU)

( * ) Notice: Subject to any disclaimer, the term of this patent is extended or adjusted under 35 U.S.C. 154(b) by 0 days.

(21) Appl. No.: 14/893,263

(22) PCT Filed: May 20, 2014

(86) PCT No.: PCT/AU2014/000531
§ 371 (c)(1),
(2) Date: Nov. 23, 2015

(87) PCT Pub. No.: WO2014/186827
PCT Pub. Date: Nov. 27, 2014

(65) Prior Publication Data
US 2016/0104119 A1  Apr. 14, 2016

(30) Foreign Application Priority Data

May 23, 2013  (AU) ................................ 2013901847

(51) Int. Cl.
*H04M 3/42* (2006.01)
*G06Q 10/10* (2012.01)
*H04W 4/02* (2009.01)

(52) U.S. Cl.
CPC ........ *G06Q 10/1093* (2013.01); *G06Q 10/109* (2013.01); *H04W 4/021* (2013.01)

(58) Field of Classification Search
CPC ..... H04W 4/021; H04W 4/022; H04W 4/023; H04W 4/04; H04W 4/02

USPC ........... 455/404.1, 404.2, 456.1, 457, 422.1, 455/414.1, 414.2, 466, 566
See application file for complete search history.

(56) References Cited

U.S. PATENT DOCUMENTS

| | | | |
|---|---|---|---|
| 6,198,696 B1 * | 3/2001 | Korpi | A63B 23/03575 368/21 |
| 7,806,695 B1 | 10/2010 | George | |
| 2001/0004725 A1 * | 6/2001 | Yagyu | G01C 21/3484 701/425 |

(Continued)

OTHER PUBLICATIONS

International Search Report issued in corresponding application No. PCT/AU2014/000531 mailed Jul. 15, 2014 (2 pages).

(Continued)

*Primary Examiner* — Jean Gelin
(74) *Attorney, Agent, or Firm* — Osha Liang LLP (57) ABSTRACT

This disclosure concerns visualizing multiple time zones in a calendar. A processor receives trip data that identifies a trip day, a first time zone of a departure location and a second time zone of an arrival location. The processor determines time gained or time lost due to travelling from the first time zone into the second time zone and causes the display of a time range and a graphical element. The time range represents the trip day with time values extending to the end of the trip day. The end of the trip day is relative to the first time zone. The graphical element extends from the day change and has an extension based on the difference between first and second time zones, such that the graphical element indicates the determined time gained or time lost due to travelling from the first time zone into the second time zone.

20 Claims, 7 Drawing Sheets (56) References Cited

U.S. PATENT DOCUMENTS

| | | |
|---|---|---|
| 2006/0136121 A1 | 6/2006 | Eisen |
| 2007/0282159 A1 | 12/2007 | Sato et al. |
| 2010/0075648 A1 | 3/2010 | Matsuoka et al. |
| 2010/0174998 A1 | 7/2010 | Lazarus et al. |
| 2012/0233563 A1 | 9/2012 | Chakra et al. |

OTHER PUBLICATIONS

Written Opinion issued in corresponding application No. PCT/AU2014/000531 mailed Jul. 15, 2014 (3 pages).

* cited by examiner

|  | Sun, Dec 9 | Mon, Dec 10 | Tue, Dec 11 | Thu, Dec 13 |
|---|---|---|---|---|
| 12am | | | | |
| 1am | | | | |
| 2am | | | | |
| 3am | | | | |
| 4am | | | | |
| 5am | | | | |
| 6am | | | | |
| 7am | | | | |
| 8am | | | | Auckland 8am |
| 9am | | | Breakfast at Tiffanys | |
| 10am | | | | |
| 11am | | | | |
| 12pm | | | | |
| 1pm | | flight from Sydney to NZ | Very IMPORTANT Meeting | flight from NZ to Sydney |
| 2pm | | | | |
| 3pm | | 5pm | | |
| 4pm | | 6pm | | 2pm |
| 5pm | | 7pm | flight from Auckland to Los Angeles | 3pm |
| 6pm | | 8pm | flight from New York to LA | 4pm |
| 7pm | | 9pm | | 5pm |
| 8pm | | 10pm | | 6pm |
| 9pm | | 11pm | | 7pm |
| 10pm | | 12am Tue AKL | 7pm | 8pm |
| 11pm | | 1am  704 | 8pm | 9pm |
| | | 2am | 9pm | 10pm |
| | | 3am | 10pm | 11pm |
| | 706 — 4am | 11pm | | |
| | | 5am  702 | 12pm | |
| | | 6am | 1am | |
| | | Mon LA | 2am | |
| | | 10am  710 | 3am | flight from LA to Auckland |
| | | 11am | 4am | |
| | 708 — 12pm | 5am | | |
| | | 1pm | 6am | |
| | | 2pm | 7am | |
| | | 3pm | 8am | |
| | | 4pm | 9am | |
| | | 5pm | flight from LA to New York | 10am |
| | | 6pm | | |
| 700 | | 7pm | | |
| | | 8pm | | |
| | | 10pm | | |
| | | 11pm | | |

Fig. 7

VISUALISING MULTIPLE TIME ZONES

TECHNICAL FIELD

This disclosure concerns visualising multiple time zones in a calendar. In particular, the invention concerns, but is not limited to, methods, software and computer systems for visualising multiple time zones in a calendar.

BACKGROUND ART

Travellers on long distance trips often face the problem that the time zone of the arrival location is different to the time zone at the departure location of the trip. Using currently available calendar solutions, such as Microsoft Outlook or Google Calendar, it is difficult for the traveller to organise appointments in different time zones without having to manually calculate time differences. In particular, the traveller needs to plan face to face meetings in a destination time zone but while planning the meetings, the traveller is still in a home time zone. This causes considerable confusion and risk for error with existing solutions.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

In a first aspect there is provided a computer-implemented method for visualising multiple time zones in a calendar, the method comprising:
  (a) receiving or determining first trip data that identifies a trip day, a first time zone associated with a departure location and a second time zone associated with an arrival location, the second time zone being different to the first time zone;
  (b) determining based on the first trip data time gained or time lost due to travelling from the first time zone into the second time zone; and
  causing the display of
    a first time range representing at least part of the trip day with time values extending to the end of the trip day, the end of the trip day being relative to the first time zone, and
    a graphical element extending from the day change and having an extension based on the difference between first and second time zones, such that the graphical element indicates the determined time gained or time lost due to travelling from the first time zone into the second time zone.

It is an advantage that the method causes the display of a graphical element that expands to visualise the time lost or time gained. As a result, the method provides a clear visualisation to a user travelling between time zones that allows the user to use the calendar more efficiently with a lower risk of error.

The graphical element may have the effect of a deletion element such that the absence of parts of the first time range indicates time lost due to travelling from the first time zone into the second time zone.

The graphical element may be an extension of the first time range and the extension may comprise incremental time values.

The first time range may represent one of day, week, month and year.

The method may further comprise causing the display of a first schedule item associated with the first time zone and a second schedule item associated with the second time zone, each schedule item being located in relation to the first time range such that a single time value on the first time range represents the local time in both the first time zone and the second time zone.

It is an advantage that the single time value on the first time range represents the local time in both the first time zone and the second time zone. As a result, a user located in the first time zone can plan events in the second time zone in the local time of the second time zone and in the same way as if the user was located in the second time zone. The user does not need to change the time zone settings of the entire calendar display.

The method may further comprise causing the display of a first trip schedule item associated with the trip data.

The first trip schedule item may be located in relation to the first time range.

The method may further comprise causing the display of a meeting schedule item embedded into the first trip schedule item to indicate a meeting during a first trip associated with the first trip data.

A dimension of the first trip schedule item may represent the duration of the trip.

The trip data may identify a trip time and the user interface may further show a second time range beginning at a first point in the user interface and extending to a second point in the user interface, wherein the first point is based on the trip time and the second point represents the end of the day in the second time zone.

It is an advantage that the second time scale extends from the trip time to the end of the day in the second time zone. As a result, the second time range may extend further or not as far as the end of the day in the first time zone, which means that time gained or time lost due to the time zone difference is displayed in an intuitive manner and schedule items can be located in relation to the second time scale. Once the end of the day in the second time zone is reached, the first time scale represents the local time in the second time zone. The resulting user interface is relatively more efficient to use and reduces the need for calculation of time zones by the user.

The graphical element may be an integral part of the second time range.

The second time range may comprise incremental time values, such that the incremental time values indicate the local time at the arrival location The method may further comprise:
  receiving or determining second trip data, that identifies the second time zone associated with the arrival location and a third time zone associated with a final location, the third time zone being different to the second time zone; and
  causing the display of a second trip schedule item associated with second trip data in relation to the second time range.

Determining the first trip data may comprise receiving a first schedule item including the departure location and a second schedule item including the arrival location and may comprise determining the first time zone based on the departure location and the second time zone based on the arrival location.

The method may further comprise:
determining a jetlag mitigation strategy; and
causing the display of a graphical element to indicate the jetlag mitigation strategy.

The steps of determining a jetlag mitigation strategy and causing the display of a graphical element to indicate the jetlag mitigation strategy may only be performed when the time gained is above a first threshold or time lost is above a second threshold.

The first threshold may be different to the second threshold.

In a second aspect there is provided software, that when installed on a computer causes the computer to perform the method of any one or more of the preceding claims.

In a third aspect there is provided a computer system for visualising multiple time zones in a calendar, the computer system comprising:
an input port to receive or a processor to determining first trip data that identifies a trip day, a first time zone associated with a departure location and a second time zone associated with an arrival location, the second time zone being different to the first time zone;
a processor to determine based on the first trip data time gained or time lost due to travelling from the first time zone into the second time zone, and to cause the display of
a first time range representing at least part of the trip day with time values extending to the end of the trip day, the end of the trip day being relative to the first time zone, and
a graphical element extending from the day change and having an extension based on the difference between first and second time zones, such that the graphical element indicates the determined time gained or time lost due to travelling from the first time zone into the second time zone.

Optional features described of any aspect, where appropriate, similarly apply to the other aspects also described here.

BRIEF DESCRIPTION OF DRAWINGS

An example will be described with reference to
FIG. 1 illustrates a computer system for visualising multiple time zones in a calendar to a user.

BEST MODE FOR CARRYING OUT THE INVENTION

Figure 1:
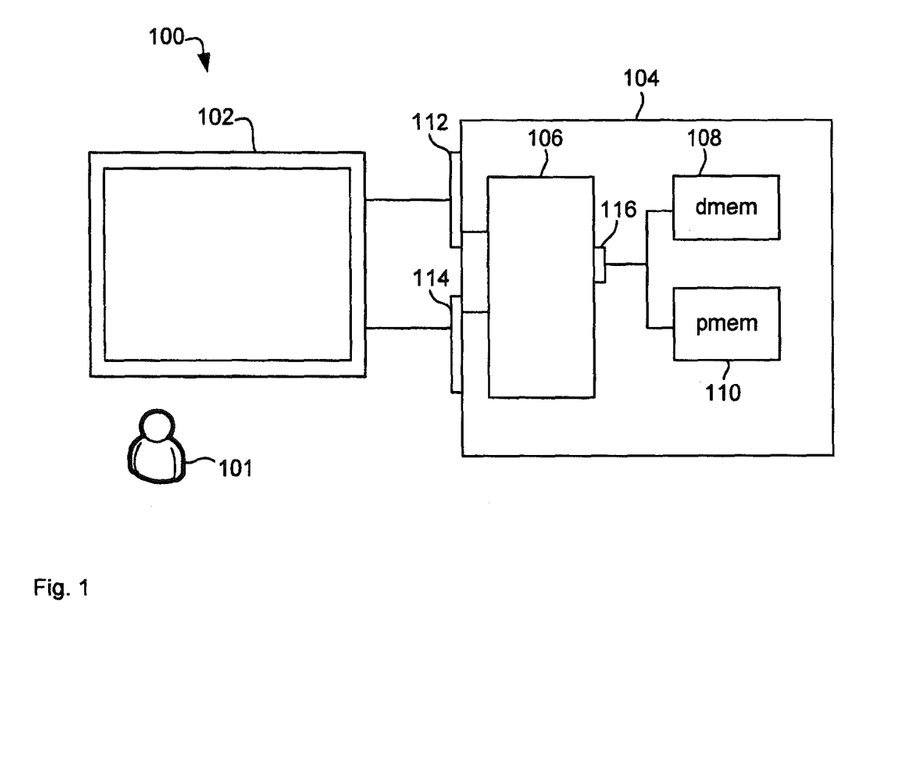

FIG. 1 illustrates a computer system 100 for visualising multiple time zones in a calendar to a user 101, such as a traveller. The traveller has booked a trip to travel between different time zones, which may be on an intercontinental flight as well as simply crossing a time zone on land, such as by crossing the border between Queensland and New South Wales in Australia during summer, when New South Wales uses Daylight Savings time but Queensland used Eastern Standard Time.

The user 101 wishes to make future appointments in the destination time zone while the user is still located in the origin time zone. Due to the change of time zones, a day as experienced by the user travelling between the time zones does not last for the usual 24 hours but has more or less than 24 hours. The user 101 needs a visualisation of these longer days, which is not provided by current solutions.

The computer system 100 comprises a display device 102 and a computer 104 including a processor 106, a data memory 108 and a program memory 110. The display device 102 is connected to the processor 106 of computer 104 via input port 112 and output port 114 of computer 104. The processor 106 is connected to data memory 108 and program memory 110 via memory port 116. In use, the processor 106 causes the display of calendar elements, such as a time range and a graphical element, by sending the elements to display device 102 via output port 114. Therefore, processor 106 executes software stored on program memory 110 that causes the processor 106 to perform the method of FIG. 2. The sending of the calendar elements, may be as pixel values, such as a png image attached to an email, as display commands, such as Direct X, or as vector graphics. Processor 106 may also send the calendar display to the data memory 108 to be stored for later use.

In this example, the data memory 108 and program memory 110 are both non-volatile hard disk memory, but of course, other memories may be used, such as RAM, on chip cache, optical disks or flash memory. In some examples, the computer system is implemented in a cloud computing environment. In such examples, a number of processors may be deployed as virtual machines to create the calendar display and the data memory 108 as well as the program memory 110 are implemented as cloud storage. In such examples, the display device 102 may be on a mobile device that is connected to the cloud via the Internet.

Computer system 100 may also be a desktop, laptop, netbook or other stand-alone computer with or without Internet connection and with or without using cloud services, such as provided by a system of servers on the Internet.

In this example, display 102 is a touch screen display, such as the display of a tablet computer. As a result, the display 102 is used by the user as an input device and the processor 106 receives the input via input port 112 from the input device 102.

The data memory 108 stores data relating to multiple schedule items, such as appointments, and the processor 106 queries the data memory 108 in order to create the display of a calendar. As a result, the processor 106 receives data from the data memory 108 via memory port 116.

Although input port 112, output port 114 and memory port 116 are shown as distinct entities, it is to be understood that any kind of data port may be used to receive and send data, such as a network connection, a memory interface, a pin of the chip package of processor 106, or logical ports, such as IP sockets or parameters of functions stored on program memory 110 and executed by processor 106. These parameters may be handled by-value or by-reference in the source code. The processor 106 may receive data through all these interfaces, which includes memory access of volatile memory, such as cache or RAM, or non-volatile memory, such as an optical disk drive, hard disk drive, storage server or cloud storage.

In one example, the display 102 is a smart phone and the computer 104 is a mail and calendar server. User 101 operates a browser or a smart phone app on the smart phone 102 to access calendar entries and trip information stored on server 104. The server determines time gained or time lost due to travelling between the time zones and causes the display of calendar items by sending calendar elements to smart phone 102 via a 3G network. In a different example, the smart phone 102 determines the time gained or time lost locally and causes the display of the calendar elements locally.

Figure 2:
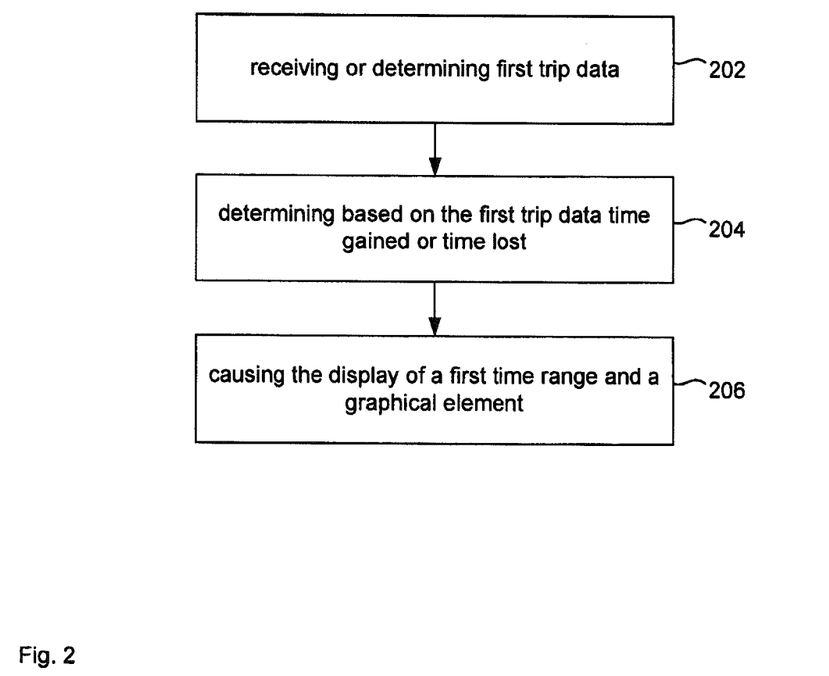
FIG. 2 illustrates a method for creating a calendar display.

FIG. 2 illustrates a method 200 for creating a calendar display as performed by processor 106. The method commences by receiving or determining 202 trip data. The trip data identifies a trip day, a first time zone associated with a departure location and a second time zone associated with an arrival location. The second time zone is different to the first time zone.

In one example, the processor 106 receives the trip data in form of an itinerary from an airline. In a different example, the processor receives a schedule item, such as a calendar entry similar to an appointment, for the departure from the departure location and determines the departure time zone based on the departure location, such as by querying a look-up table that correlates locations and time zones. Similarly, the processor 106 receives a further schedule item for the arrival at the arrival location and determines the arrival time zone based on the arrival location. Of course, the two schedule items may be the same schedule item, which means that one single calendar entry identifies the departure location and the arrival location, such as "8 am to 1 pm; Flight from Sydney to Perth".

The processor 106 may further build transport information based on the arrival time zone via the detection of the location of the scheduled entry. Any ground travel that is required in the arrival time zone, such as catching a train from the airport to the hotel, is organised by processor 106 in the arrival time zone such that all local travel times are in relation the local time at the arrival location.

In one example, the processor 106 receives the trip data from memory, where a trip itinerary is stored. In other examples, user 101 books a trip, such as a flight with a booking agent and the processor 106 receives the trip data in form of a booking confirmation. In yet another example, the user 101 selects a control on display device 102, such as "new trip", to activate a user input that allows the user 101 to manually enter the trip data.

In another example, trip data includes an origin time zone (software program variable TZ_o) associated with the departure location and a destination time zone (software program variable TZ_d) associated with the arrival location. In another example, the trip data includes departure and destination identifiers, such as names of cities or airport codes, and the processor 106 automatically determines the corresponding time zones.

The departure and destination time zones may be received by a software function as a signed integer such as 'TZ_o=10' for 'GMT+10' for Sydney or 'TZ_d=−8' for 'GMT−8' for Los Angeles. GMT and UTC may be used interchangeably in the current context. The received data further comprises an arrival time T_a, which may be in relation to the departure time zone, the destination time zone, or any other known time zone. In the following description, square brackets are used to denote the time zone of a given time, such that, for example, T_a[TZ_d] denotes the arrival time in the destination time zone.

It is noted here that the arrival time or any other time can be easily adjusted to different time zones by existing library routines of common programming languages.

Alternatively, the time may be converted to a linear measure, such as Unix Time, the current time zone subtracted and the new time zone added. The result is the converted back into a common time format, such as DD/MM/YYYY hh:mm.

In another example, the journey data includes the departure time and the duration and the processor 106 determines the arrival time.

The next step of method 200 in FIG. 2 is determining 204 time gained or time lost due to travelling from the first time zone into the second time zone. This determination is based on the first trip data, that is, the first time zone and the second time zone. In one example, the time lost is calculated by:

$$\text{time\_lost}=\text{arrival\_time\_zone}-\text{departure\_time\_zone}$$

A negative value for time_lost indicates that the user 101 gains time, that is, the user's 101 day is longer than 24 hours. Vice versa, a positive value for time_lost indicates that the user 101 loses time and the user's 101 day is shorter than 24 hours.

The following step of method 200 is causing display of a first time range and a graphical element.

Figure 3:
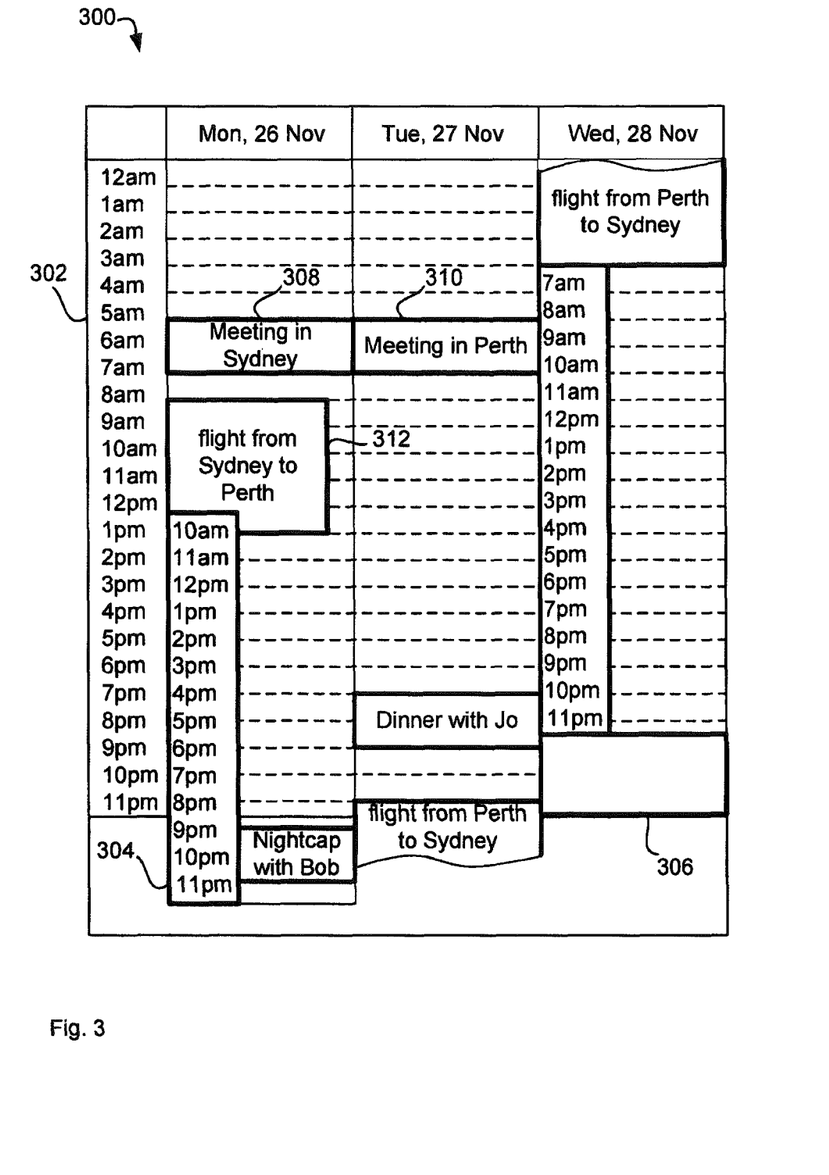
FIGS. 3 to 7 illustrate examples of calendar displays.

FIG. 3 illustrates an example calendar display 300 for the following example scenario. User 101 plans to leave Sydney (GMT +10) on a Monday at 10 am to attend a meeting in Perth (GMT +7). The flight has a 5 hour duration. The user 101 will arrive in Perth at noon Perth time (3 pm Sydney time). Due to the different time zones, the user 101 gains 3 hours and the user's day has 27 hours.

The calendar display 300 comprises a first time range 302, also referred to as a global time range. While in the example of FIG. 3 the global time range 302 represents the entire trip day, in other examples the global time range 302 only represents part of the trip day, such as if the user 101 has adjusted calendar display 300 to only show the afternoon. As can be seen in FIG. 3, time values extend along the global time range 302 up to the end of the trip day. Here, the end of the trip day is relative to the first time zone. In the example above, the end of the trip day is midnight Sydney time.

The calendar display 300 further comprises a graphical element 304. The graphical element 304 extends from the day change of the user's day, which is the end of the current day and beginning of the next day. In most cases, this would be midnight in the time zone in which the user is located at that time. In the above example, the day change is midnight Perth time.

The graphical element extends from the day change and has an extension that is based on the difference between Sydney and Perth time zones. This way, the graphical element indicates the determined time gained or time lost due to travelling from the first time zone into the second time zone.

In the example of FIG. 3, the day change occurs outside the global time range 302 and therefore, the graphical element 304 extends from outside the global time range 302 upwardly. As a result, the graphical element 304 extends further than the global time range 302 at the bottom and therefore indicates that the user 101 gained three hours that day. When the next day begins, which is Tuesday in this example, the global time range 302 again indicates the local time in the arrival time zone. That is, the global time range always indicates the local time where the user 101 is located except on days that are extended or shortened by the user 101 travelling between different time zones.

When the user 101 flies back from Perth to Sydney on Wednesday 320, the same method is performed. The user 101 plans on returning the next day, that is on Tuesday 320. A 2 pm flight is booked and the flight will take 4 hours. The user 101 will arrive in Sydney at 9 pm (6 pm Perth time). This will make Tuesday 320 a 21 hour day.

The processor 106 determines that the user 101 loses 3 hours and causes display of second graphical element 306. This time, the day change occurs at midnight Sydney time, which is earlier than midnight Perth time. As a result, the second graphical element 306 extends from a point that is within global time scale 302 and downwardly by 3 hours.

In this example, global time range 302 also comprises a grid (in dashed lines) to mark every hour. Second graphical element 306 has the effect of a deletion element, which means that the presence of the second graphical element 306 causes the dashed grid lines being absent, that is, not visible. This absence of the grid lines indicates the time lost to the user 101 due to travelling between different time zones.

In another example, the effect of a deletion element is achieved without placing an additional element, such as an additional white rectangle, onto the calendar display but by omitting the parts of calendar display 300 that would be covered by the second graphical element 306 when rendering the calendar display 300.

In another example, graphical element 304 is an extension of the global time range 302. This means that the global time range 302 extends further than midnight, that is, further than what is shown in FIG. 3. This extension of the global time range 302 may be labelled with the time values of the Perth time, labelled with incremental values, such as +1 h, +2 h, +3 h and so on, or may be blank.

In the example of FIG. 3, the global time range 302 represents three consecutive days. However, the user 101 may direct the display device 102, such that the global time range 302 represents a single day, a working week, such as Monday to Friday, an entire week, such as Monday to Sunday, an entire month or even an entire year. When switching between these different options, the global time range 302 may remain unchanged but the number of days that are displayed aligned to the global time range 302 changes.

Calendar display 300 further comprises a first schedule item 308, such as a calendar entry, for a meeting in Sydney and a second schedule item 310 for a meeting in Perth. The first schedule item 308 is associated with the departure time zone, which means that the first schedule item 308 denotes the meeting time in Sydney time. Vice versa, the second schedule item 310 is associated with the arrival time zone, which means that the second schedule item 310 denotes the meeting time in Perth time.

The processor 106 causes the display of the first schedule item 308 and a second schedule item 310 on calendar display 300. The global time range 302 represents the local time for both the first and the second schedule items although the two schedule items are associated with different time zones. As a result, both schedule items are located in relation to the global 302 time range such that a single time value on the global time range 302 represents the local time in both the departure time zone and the arrival time zone.

For example, the single value '5 am' on the global time range 302 represents '5 am' Sydney time on Monday, 26 November and also represents '5 am' Perth time on Tuesday, 27 November. In this example, the two schedule items 308 and 310 are at the same local time, that is, both at 5 am. It is noted however, that if the meeting in Perth was later, such as at 12 pm and therefore, the second schedule item 310 was displayed further down on Tuesday, the second time schedule is also located such that a single time value on the global time range 302 represents the local time in both the departure time zone and the arrival time zone. The user 101 does not need to switch time range for different time zones but the global time range 302 naturally represents the local time where the user will be located at the time of the respective meeting.

The only exception is on days where the user 101 travel between time zones. In this case a graphical element 304 indicates time gained or time lost. In one example, the calendar display 300 further shows a second time range, and, in the example of FIG. 3, the graphical element 304 is an integral part of the second time range. Therefore, the second time range is referred to with the same reference numeral as the graphical element 304. The second time range 304 begins at a point that is determined by the trip time and the departure time. The calendar display 300 comprises a departure schedule item 312 for a flight from Sydney to Perth leaving Sydney at 8 am Sydney time. In this example, the trip time is the arrival time in Perth, that is 1 pm Sydney time/10 am Perth time and the second time range 304 begins at that time. As a result, the user 101 operates under Sydney time while the user is on the plane.

In a different example, the trip time is the departure time, that is Sam Sydney time/5 am Perth time and the second time range 304 begins at the departure time. As a result, user 101 operates under Perth time while the user is on the plane. The user 101 may choose between the different options for the trip time under user preferences. The time zone dislocation a traveller experiences which on long haul flights can substantially contribute to jetlag. This effect can be mitigated by moving the time zone change from the arrival time, to the departure of a flight or by evenly spreading the change during all or part of the transit period. In all of these examples, the processor 106 determines a jetlag mitigation strategy, such as providing a jetlag time range which is displayed along the flight schedule item for the flight, to indicate the jetlag mitigation strategy.

In one example, processor 106 detects conditions that could lead to jetlag and schedules a jetlag mitigation program using a number of different models.

1 At time of scheduling an event processor 106 determines whether the combination of time zone change & transit time could have a jetlag effect.
   a. User determined parameters for jetlag susceptibility.
2 Offer jetlag assistance program when jetlag risk determined.
   a. Embedded UI element associated with the relevant scheduled events.
   b. The processor 106 triggers events & scheduling restrictions before and after the trip to assist with preventing jetlag pre & in-flight as well as managing it post flight.
   c. The processor 106 determines from the users schedule if the trip is short term or long term and tailor a jetlag mitigation strategy to suite.
3 Examples of jetlag mitigation strategies based on scheduled events & restrictions are:
   a. Best times for exposure to light or dark.
   b. Best times for sleep, wake, meals, focus, etc
   c. Alert user to times that wouldn't be ideal for events requiring focus.
   d. Not allow scheduling of tasks or events at times that deemed required for managing jetlag, such as a short daytime sleep.
   e. Most effective times for taking of certain supplements, i.e. hormones such as Melatonin to help with the "circadian rhythm" (Folkard S. Circadian performance rhythms: some practical and theoretical considerations. Philos Trans R Soc Lond B1990;327:543-53.).

These jetlag mitigation strategies can be displayed as ordinary schedule items to indicated the respective strategy.

The second time scale 304 extends to the end of the day in the arrival time zone. In most examples, the end of the day is 12 am midnight, but a different time for the end of the day, such as end of the working day (5 pm), may be chosen. The second time range 304 in FIG. 3 comprises incremental time values, such that the incremental time values indicate the local time at the arrival location. In this example, the incremental time values range from 10 am, that is, the arrival time in Perth, to 11 pm, that is, the end of the day in Perth.

Figure 4:
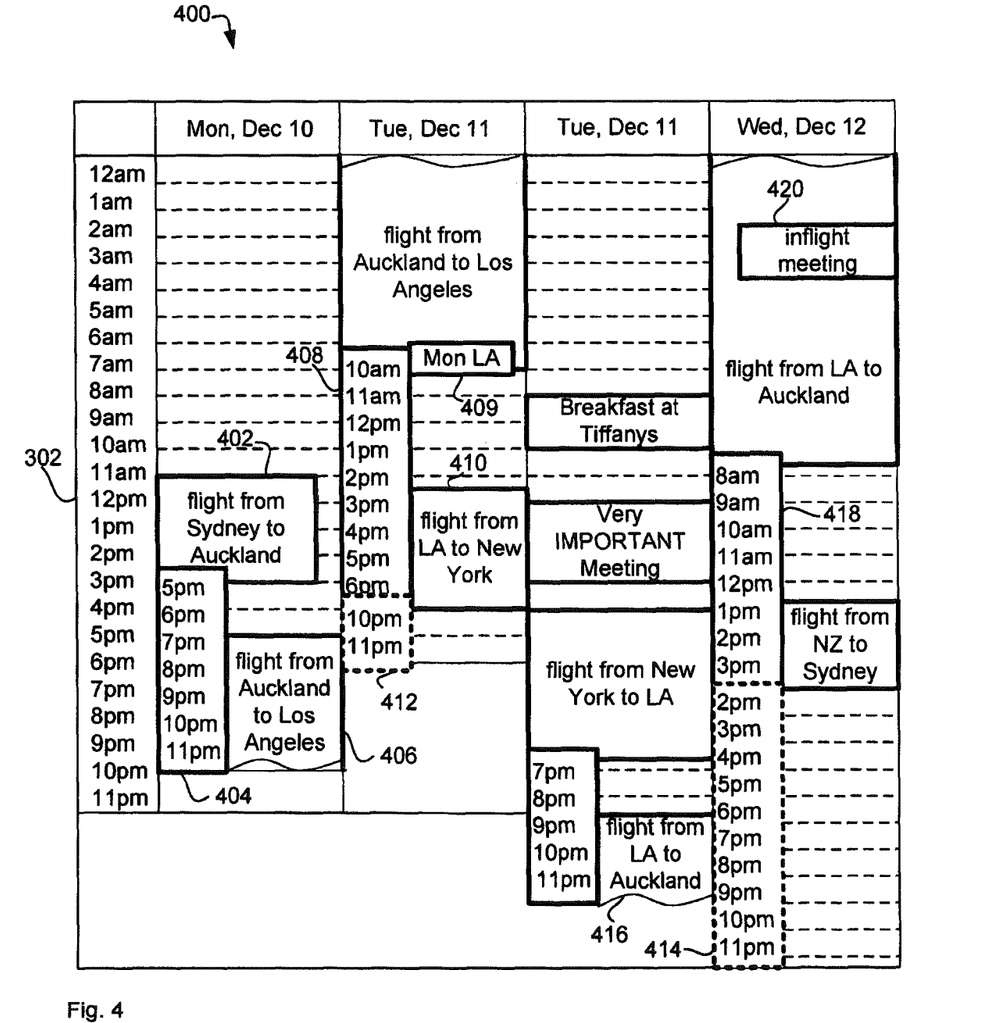

FIG. 4 illustrates a further example of a calendar display 400 of a user travelling between more than two different time zones. Similar to FIG. 3, calendar display 400 comprises global time range 302 and user 101 travels from Sydney to Auckland, New Zealand leaving on 11 am Sydney time, which is referred to as the first time zone. As described earlier, processor 106 receives this first trip data and causes display of a first schedule item 402, an Auckland time scale 404 where Auckland time is referred to as second time zone.

In this example, user 101 has booked another flight on the same day from Auckland to Los Angeles, which is represented by second trip data and which the processor 106 also receives. The second trip data identifies the second time zone associated with the arrival location, that is, Auckland time, and a third time zone associated with a final location, that is, Los Angeles time associated with Los Angeles.

Similar to the earlier examples, processor 106 may also determine the trip data, such as by looking up time zones based on the names of the cities. The processor 106 then causes the display of a second trip schedule item 406, such as a calendar entry, associated with second trip data in relation to the second time range. This means that the Auckland time scale 404 is used to display the second trip schedule item 406 in Auckland time. This way it is easy for the user 101 to see that there is a gap from 5 pm to 7 pm Auckland time where a meeting or appointment can be organised while the user 101 is in transit at the airport.

Of course, other examples can be even more complex, such as when the user 101 arrives in Los Angeles, a Los Angeles time range 408 is displayed. Since the user 101 crosses the international date line between Auckland an Los Angeles, it is still Monday morning when the user 101 arrives in Los Angeles. This is indicated by a day change schedule item 409. In this example, the column for Tuesday is duplicated to provide sufficient space.

User 101 departs in Los Angeles and arrives in New York at the same day as the user 101 arrived in Los Angeles. As a result, a third trip schedule item 410 is displayed to indicate that flight. In this case, the Los Angeles time range 408 extends until the user arrives in New York, where the Los Angeles time range 408 ends and a New York time range 412 begins. It is noted, that the Los Angeles time range 408 and the New York time range 412 may be referred to as one single time range that extends from the first point based on the trip time and the end of the day in the New York time zone. In other words, the single combined time range is broken up by another flight between further time zones but otherwise shares all characteristics of the time range 304 of the simpler example in FIG. 3.

Calendar display 400 further comprises a Sydney time range 414, which shows that similar to the calendar display of FIG. 3, a time range can be integral with a graphical element indicating the time gained or time lost. In this case, the user 101 gains five hours.

Calendar display 400 further comprises a flight schedule item 416 indicating a flight from Los Angeles to Auckland, an Auckland time range 418 and an inflight meeting schedule item 420 within the flight schedule item 416. The inflight schedule item 418 may be relative to Los Angeles time as indicated by global time range 302 or to Auckland time. When the user 101 organises inflight meeting 416 in Auckland time, it may be convenient that the Auckland time range 418 extends to the departure time of the flight schedule item 416 indicating the flight from Los Angeles to Auckland as explained with reference to FIG. 3.

Figure 5:
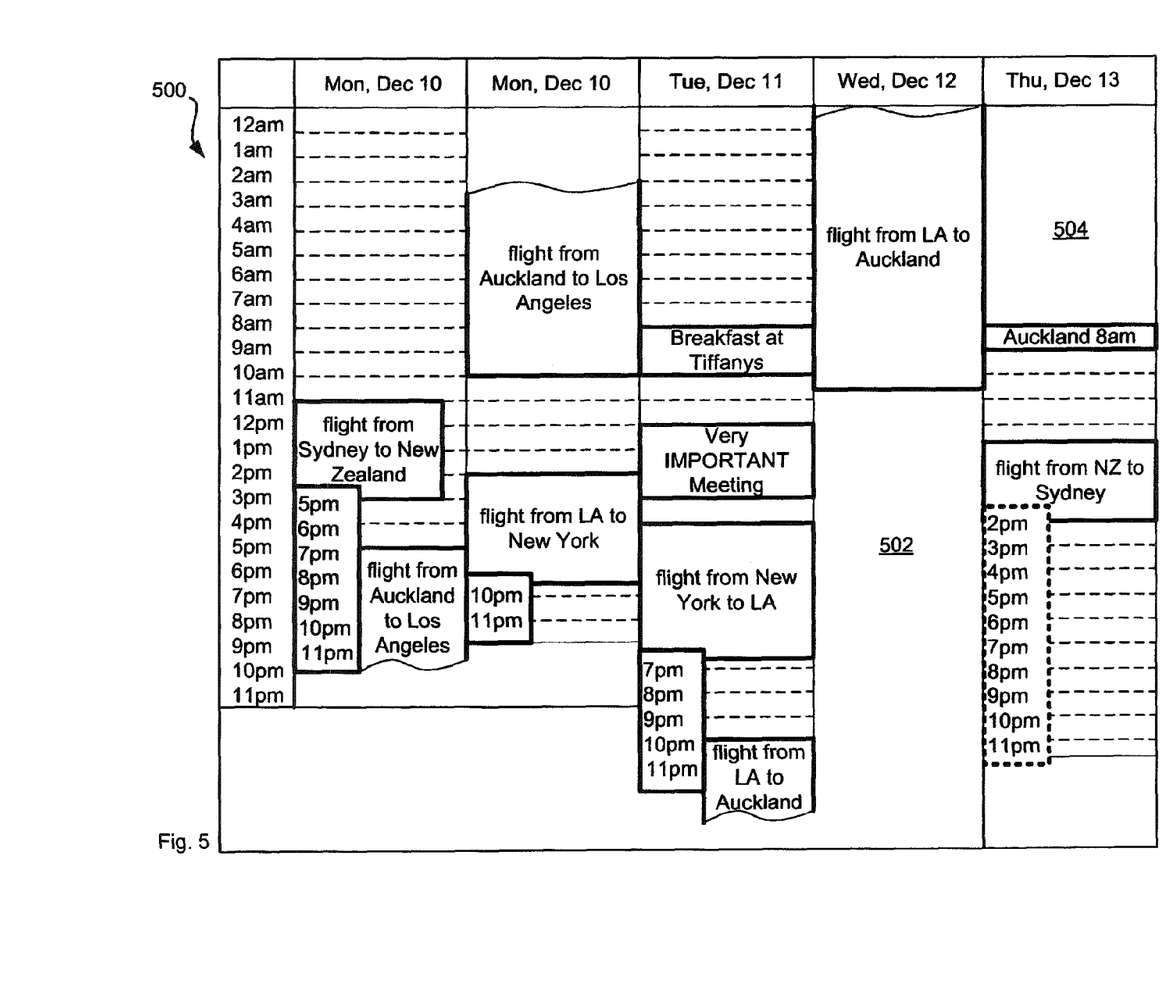
Figure 6:
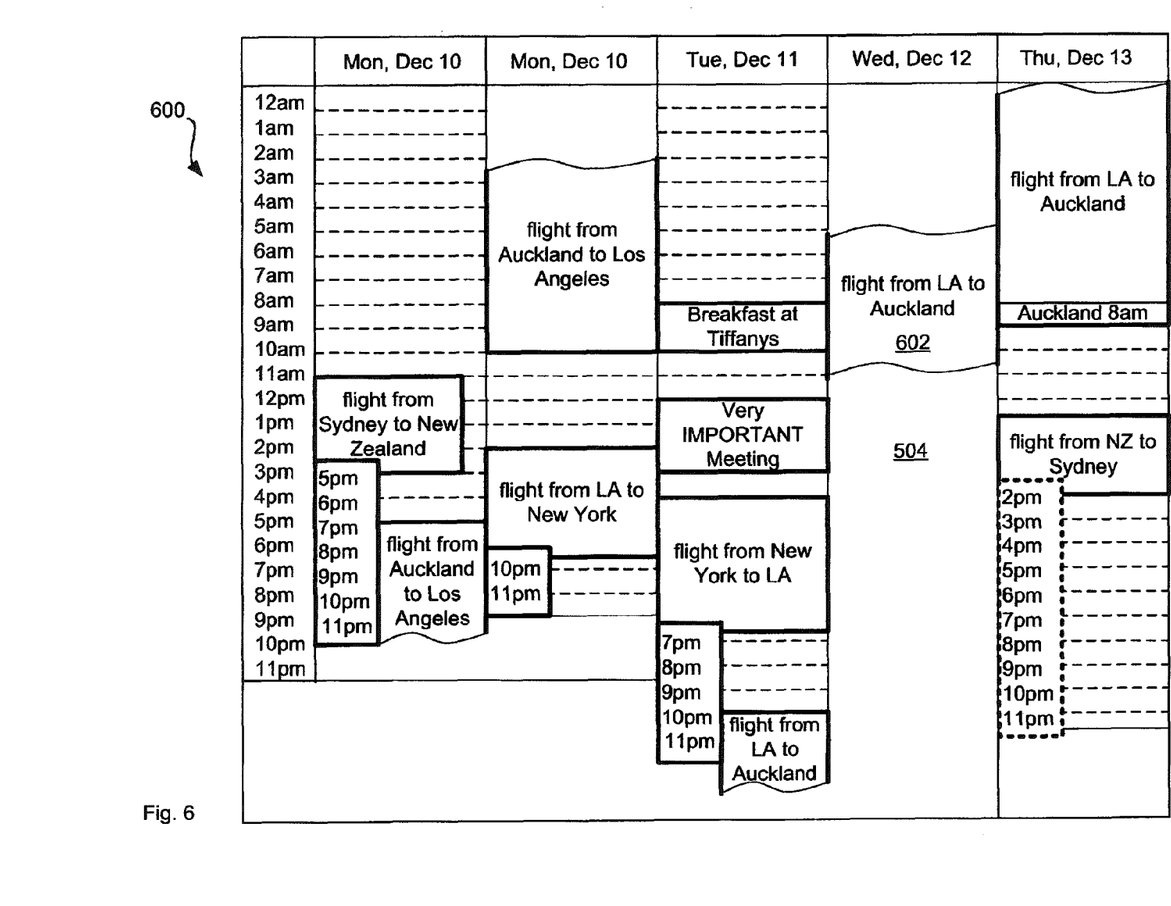

FIG. 5 illustrates yet another example of a calendar display 500 for a user crossing the international date line. The calendar display 500 comprises first deletion element 502 and second deletion element 504. The first deletion element 502 indicates that the user 101 loses 13 hours of Wednesday after a flight from Los Angeles to Auckland. However, due to the date change, it is Thursday 8 am in Auckland when the user arrives there after leaving Los Angeles on Tuesday. As a result, second deletion element 504 extends from the beginning of Thursday to the arrival time, that is, Thursday 8am Auckland time. In more extreme examples, the second deletion element 504 can cover an entire day, which is illustrated in FIG. 6 comprising a fragment 602. Top truncation with floating schedulable time 602 represented for a West to East dateline crossing. The floating fragment 602 of the flight displayed Wednesday represents the portion of the flight time that is missing between the departure portion shown on Tuesday and the arrival portion that is shown on Thursday. The total time of the flight is displayed and available for the user to schedule for in-transit tasks.

Figure 7:
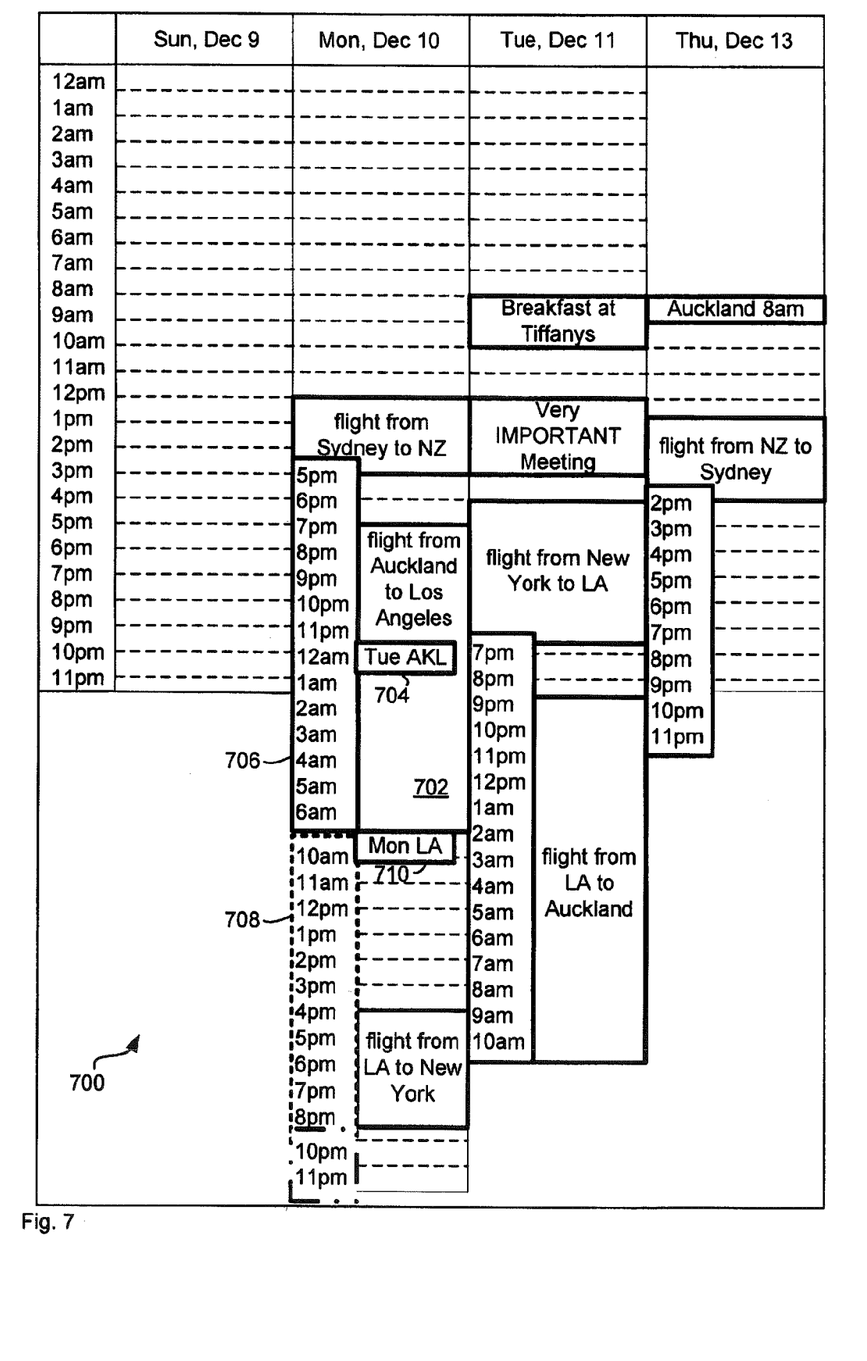

FIG. 7 illustrates yet another calendar display 700 of a user 101 crossing the international date line such that the arrival time is before the departure time. Calendar display 700 comprises a flight schedule item 702 to indicate a flight from Auckland to Los Angeles on Monday. A first day change schedule item 704 indicates the end of the day in Auckland. As explained earlier, an Auckland time range 706 indicates Auckland time. Since the flight from Auckland to Los Angeles departs Monday and arrives Monday, the Auckland time range 706 extends for the entire length of the schedule item 702.

At the end of the flight time, which is at arrival at Los Angeles, a Los Angeles time range 708 continues with the local time at Los Angeles. A second day change schedule item 710 indicates that the remainder of the day is still Monday. This is further indicated by the Los Angeles time range 708 being located in the Monday column. This offers a convenient solution to clearly visualise to the user 101 that the arrival time is before the departure time.

In some examples, computer 104 is a mobile device, such as a smart phone, and has an inbuilt time module (not shown) that is set to the local time for the current location of the user. As the user travels to a different time zone, the time module is set to the new time zone. Different examples are possible:

1 The time is changed at the beginning of the flight. This can help get the user accustomed to the new time zone they are travelling to.

2 The time is changed on the device based on the arrival time at the destination. This is typically announced on the plane and used by many travellers 3 Time changes on the device as you pass over time zones on the journey. Each time the plane crosses a time zone the time on the device changes.

4 Time is expanded or contracted to evenly spread the total change.

In another example, locational information that is added to users' schedules is used to generate travel time and location information. If the traveller is crossing a time zone then differences for their time of day are calculated and represented in the calendar. A threshold determines if the travel distance significantly crosses enough time zones to trigger off a jetlag assistance program. A first threshold applies to the time gained due to travelling east to west and a second threshold applies to the time lost due to travelling from west to east. In one example, the threshold for triggering a jetlag mitigation routine when travelling from east to west is 3 hours and for travelling from west to east is 2 hours. In different examples, the first threshold is equal to the second threshold.

It should be understood that although some examples refer to box shaped objects, a wide range of different visualisation techniques is also possible, such as colour, transparency and shape of elements in the calendar displays.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating" or "generating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method for visualising multiple time zones in a calendar, the method comprising:
   (a) receiving or determining first trip data that identifies a trip day, a first time zone associated with a departure location and a second time zone associated with an arrival location, the second time zone being different to the first time zone;
   (b) determining based on the first trip data time gained or time lost due to travelling from the first time zone into the second time zone; and
   (c) causing the display of:
      a first time range representing at least part of the trip day with time values extending to the end of the trip day, the end of the trip day being relative to the first time zone, and
      a graphical element extending from the day change and having an extension based on the difference between first and second time zones, such that the graphical element indicates the determined time gained or time lost due to travelling from the first time zone into the second time zone.

2. The method of claim 1, wherein the graphical element has the effect of a deletion element such that the absence of parts of the first time range indicates time lost due to travelling from the first time zone into the second time zone.

3. The method of claim 1, wherein the graphical element is an extension of the first time range.

4. The method of claim 3, wherein the extension comprises incremental time values.

5. The method of claim 1, wherein the first time range represents one of day, week, month and year.

6. The method of claim 1, further comprising causing the display of a first schedule item associated with the first time zone and a second schedule item associated with the second time zone, each schedule item being located in relation to the first time range such that a single time value on the first time range represents the local time in both the first time zone and the second time zone.

7. The method of claim 1, further comprising causing the display of a first trip schedule item associated with the trip data.

8. The method of claim 7, wherein the first trip schedule item is located in relation to the first time range.

9. The method of claim 7, further comprising causing the display of a meeting schedule item embedded into the first trip schedule item to indicate a meeting during a first trip associated with the first trip data.

10. The method of claim 9, wherein the second time range comprises incremental time values, such that the incremental time values indicate the local time at the arrival location.

11. The method of claim 7, wherein a dimension of the first trip schedule item represents the duration of the trip.

12. The method of claim 11, wherein the graphical element is an integral part of the second time range.

13. The method of claim 11, further comprising:
    receiving or determining second trip data, that identifies the second time zone associated with the arrival location and a third time zone associated with a final location, the third time zone being different to the second time zone; and
    causing the display of a second trip schedule item associated with second trip data in relation to the second time range.

14. The method of claim 1, wherein the trip data identifies a trip time and the user interface further shows a second time range beginning at a first point in the user interface and extending to a second point in the user interface, wherein the first point is based on the trip time and the second point represents the end of the day in the second time zone.

15. The method of claim 1, wherein determining the first trip data comprises receiving a first schedule item including the departure location and a second schedule item including the arrival location and comprises determining the first time zone based on the departure location and the second time zone based on the arrival location.

16. The method of claim 1, further comprising:
    determining a jetlag mitigation strategy; and causing the display of a graphical element to indicate the jetlag mitigation strategy.

17. The method of claim 16, wherein the steps of determining a jetlag mitigation strategy and causing the display of a graphical element to indicate the jetlag mitigation strategy is only performed when the time gained is above a first threshold or time lost is above a second threshold.

18. The method of claim 17, wherein the first threshold is different to the second threshold.

19. A non-transitory computer readable medium, including computer-executable instructions stored thereon that when executed by a processor causes the processor to perform a method comprising:
  (a) receiving or determining first trip data that identifies a trip day, a first time zone associated with a departure location and a second time zone associated with an arrival location, the second time zone being different to the first time zone;
  (b) determining based on the first trip data time gained or time lost due to travelling from the first time zone into the second time zone; and
  (c) causing the display of:
    a first time range representing at least part of the trip day with time values extending to the end of the trip day, the end of the trip day being relative to the first time zone, and
    a graphical element extending from the day change and having an extension based on the difference between first and second time zones, such that the graphical element indicates the determined time gained or time lost due to travelling from the first time zone into the second time zone.

20. A computer system for visualising multiple time zones in a calendar, the computer system comprising:
  an input port to receive or a processor to determining first trip data that identifies a trip day, a first time zone associated with a departure location and a second time zone associated with an arrival location, the second time zone being different to the first time zone;
  a processor to determine based on the first trip data time gained or time lost due to travelling from the first time zone into the second time zone, and to cause the display of:
    a first time range representing at least part of the trip day with time values extending to the end of the trip day, the end of the trip day being relative to the first time zone, and
    a graphical element extending from the day change and having an extension based on the difference between first and second time zones, such that the graphical element indicates the determined time gained or time lost due to travelling from the first time zone into the second time zone.

* * * * *